US006184994B1

United States Patent
Freischlad

(10) Patent No.: US 6,184,994 B1
(45) Date of Patent: Feb. 6, 2001

(54) METHOD AND APPARATUS FOR ABSOLUTELY MEASURING FLAT AND SPERICAL SURFACES WITH HIGH SPATAL RESOLUTION

(75) Inventor: Klaus Freischlad, Tucson, AZ (US)

(73) Assignee: ADE Phase Shift Technology, Tucson, AZ (US)

(*) Notice: Under 35 U.S.C. 154(b), the term of this patent shall be extended for 0 days.

(21) Appl. No.: 09/421,636

(22) Filed: Oct. 20, 1999

(51) Int. Cl.$^7$ ........................................ G01B 9/02
(52) U.S. Cl. .................................. 356/511; 356/515
(58) Field of Search .................... 356/511, 513, 356/514, 515

(56) References Cited

U.S. PATENT DOCUMENTS

| 5,106,194 | 4/1992 | Kuchel . |
| 5,502,566 | 3/1996 | Ai . |
| 5,822,066 | * 10/1998 | Jeong et al. . |

OTHER PUBLICATIONS

J.H. Bruning, D.R. Herriott, J.E. Gallagher, D.P. Rosenfeld, A.D. White, D.J. Brangaccio, "Digital Wavefront Measuring Interferometer for Testing Optical Surfaces and Lenses", *Applied Optics* 13, 2693 (1974).

G. Schulz, J. Schwider, "Interferometric Testing of Smooth Surfaces" *Progress in Optics 13*, Ed. E. Wolf, No.Holland 1976.

B. S. Fritz, "Absolute Calibration of an Optical Flat" *Optical Engineering* 23, 379 (1984).

J. Grzanna, G. Schulz, "Absolute Testing of Flatness Standards at Square–Grid Points", *Optics Communications,* 77, 107 (1990).

M. Kuchel, Method and Apparatus for Absolute Interferometric Testing of Plane Surfaces, United States Patent 5,106,194, 1992.

G. Schulz, Absolute Flatness Testing by the Rotation Method Using Two Angles of Rotation, *Applied Optics* 32, 1055 (1993).

G. Schulz, J. Grzanna, Absolute Flatness Testing by the Rotation Method with Optimal Measuring–Error Compensation, *Applied Optics* 31, 3767 (1992).

C.Ai, J.C.Wyant, Absolute Testing of Flats by Using Even and Odd Functions, *Applied Optics,* 32, 4698 (1993).

C.J. Evans, R.N. Kestner,"Test Optics Error Removal", *Applied Optics* 35, 1015 (1996).

C.Ai, J. Wyant, L.Z. Shao, R.E. Parks, "Method and Apparatus for Absolute Measurement of Entire Surfaces of Flats", United States patent No. 5,502,566, 1996.

K. Freischlad and C.L. Koliopoulos, "Fourier Description of Digital Phase–Measuring Interferometry", *Journal Optical Soc., Am.A.,* vol. 7, 542–551 (1990).

W.H. Press, B.P. Flannery, S.A. Teukolsky and W.T. Vetterling, "Numerical Recipes in C", *Cambridge University Press,* Cambridge 1988.

K.E. Elssner, J.Grzanna, G. Schulz, "Interferentielle Absolutpruving von Spharizitatsnormalen" *Optica Acta* 27, 563, (1980).

K.E. Elssner, R.Buro, J.Grzanna, R. Spolaczyk, "Absolute Sphericity Measurement" *Applied Optics* 28, 4649 (1989).

* cited by examiner

Primary Examiner—Robert Kim
(74) Attorney, Agent, or Firm—LaValle D. Ptak

(57) ABSTRACT

The absolute interferometric measurement of the shape of either flat, or spherical surfaces is achieved by incorporating a Fizeau-interferometer and a test piece holder capable of several degrees of freedom of movement relative to the reference position in the interferometer. A data acquisition and processing technique inter-compares three test parts in various combinations. Full surface absolute maps for each of the test pieces are determined using at least two different rotational positions of one test-piece to yield rotationally sheared maps of that surface. An optimized numerical reconstruction algorithm employing linear filtering and superposition of different angular shear spectra in the angular frequency domain is employed. The method does not require any assumptions about the surfaces under test; and it has low error propagation, even in the case of high spatial resolution.

27 Claims, 6 Drawing Sheets

| Interferometer viewing direction | Reference Surface | Test Surface | | Coordinate Systems on interferogram detector |
|---|---|---|---|---|
|  |  | | $m_1$ |  |
|  |  | | $m_2$ |  |
|  |  | | $m_3$ |  |
|  |  | | $m_4$ |  |
|  |  | | $m_5$ |  |
|  |  | | $m_6$ |  |
|  |  | | $m_7$ |  |
|  |  | | $m_8$ |  |

FIG. 5A
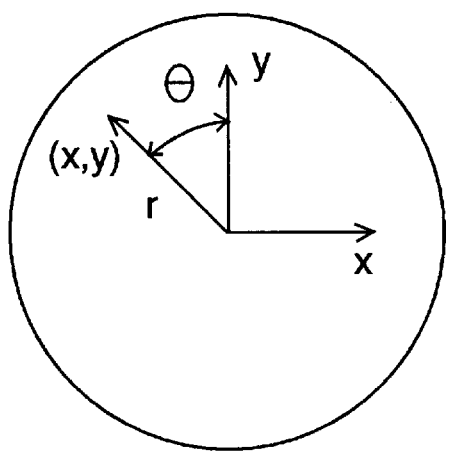
FIG. 5B
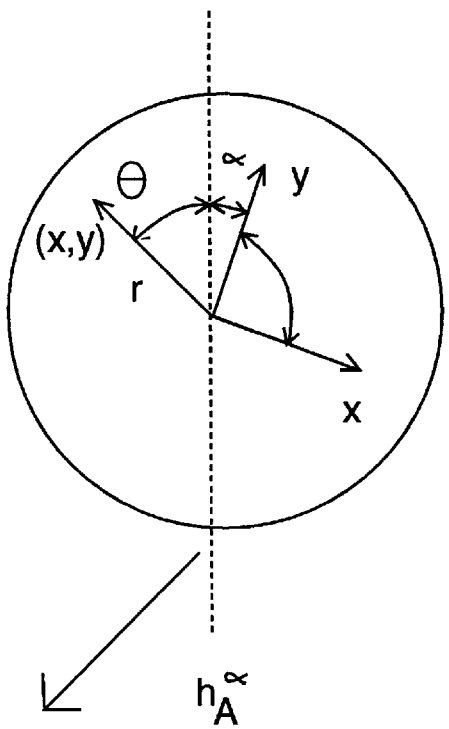
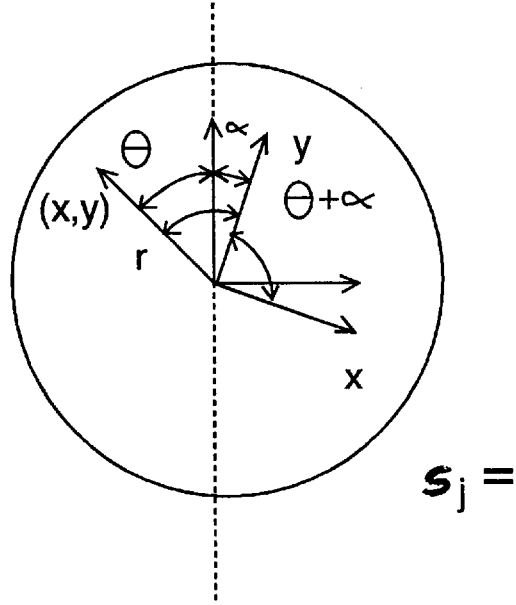
$$s_j = h_A^{\alpha_j} - h_A$$
FIG. 5C

METHOD AND APPARATUS FOR ABSOLUTELY MEASURING FLAT AND SPERICAL SURFACES WITH HIGH SPATAL RESOLUTION

BACKGROUND

High-accuracy interferometric surface metrology is constantly gaining importance, not only in the classical area of optical fabrication, but also for new applications, such as magnetic disc flatness or semiconductor wafer flatness. Requirements for measurement resolution in the subnanometer range have become quite common. Of high importance is the slowly varying shape error, as well as the medium to high spatial frequency waviness of the surface under test. Achieving not only repeatability or reproducibility, but also absolute measurement accuracy for surface height measurements, with high spatial resolution, is difficult, since other applicable measurement techniques for calibration do not exist which are considerably more accurate than the interferometric test.

In the two-beam interferometers commonly used for testing, that is Fizeau-interferometer, Twyman-Green interferometer, or Mach-Zehnder interferometer, an illuminating beam is split into two beams. One beam, called the test beam, is directed to the surface under test, where it is reflected. The other beam, called the reference beam, is reflected at a reference surface. After recombination, the two reflected beams travel to a detector, usually a camera, where they interfere. The primary information contained in the resulting interferogram is then the phase difference between these two beams. Therefore, the shape of the test surface is not obtained independently, but only in combination with the reference surface. While the repeatability of the measurements can be extremely high, the measurement result of the test surface is only as accurate as the reference surface. If the reference surface deviations can be determined in a calibration step, they can be eliminated from the measurement. Then, the overall accuracy of the test surface map is limited by the accuracy of this calibration map.

The determination of a test surface independent of the reference surface is called an absolute measurement. Once one surface is absolutely known, it can act as a reference standard in subsequent interferometric tests, allowing for absolute testing. Thus, it is very desirable to have a technique available which provides an absolute surface deviation map without requiring any information about the shape of the other surfaces involved in the interferometric test.

The Fizeau interferometer configuration inherently is best suited for high accuracy testing, since the test beam and the reference beam are split by the last surface of the interferometer optics. The reference beam is reflected at this reference surface; and it is directed to the interferogram detector. The test beam is transmitted through the reference surface to the surface under test, from where it is reflected back to the interferometer and the interferogram detector. Consequently, all internal optical components of the interferometer are traversed by the test beam, as well as by the reference beam. These optical components are all in the common path of the two beams. Phase distributions resulting from the optics in the common path are the same for both beams. Consequently, these optics phase distributions drop out of the phase difference between the two beams. The only two surfaces which then are not in a common path are the reference surface and the test surface, and the interferogram phase is proportional only to the sum of both of these surface deviations.

The cancellation of the phase distributions due to the internal interferometer optics is strictly true only when the test beam and the reference beam travel on identical paths through the interferometer optics. This can only be the case when the test surface and the reference surface are identical, and are placed close to each other. Otherwise, a residual phase error, the so-called retrace error, due to the interferometer optics, is superposed on the measurement. Furthermore, in order to avoid difraction effects on the two beams interfering on the detector, the test surface has to be well imaged onto the interferogram detector. Thus, a highly accurate interferometric test requires that the surface deviations of the test surface are small, that the test and reference surfaces are aligned parallel to one another, and that the optical design of the interferometer optics minimizes re-trace errors.

Several techniques for absolute flatness testing have been described in the past; and they are listed below in the following articles:

List of Articles

1. G.Schulz, J.Schwider, "PRECISE MEASUREMENT OF PLANENESS" *Applied Optics* 6, 1077 (1967)

2. G.Schulz, J.Schwider, "INTERFEROMETRIC TESTING OF SMOOTH SURFACES" *Progress in Optics* 13, Ed.E Wolf, No.Holland 1976

3. B. S. Fritz, "ABSOLUTE CALIBRATION OF AN OPTICAL FLAT" *Optical Engineering* 23, 379 (1984)

4. J.Grzanna, G.Schulz, "ABSOLUTE TESTING OF FLATNESS STANDARDS AT SQUARE-GRID POINTS", *Optics Communications*, 77, 107 (1990)

5. M.Kuchel, "METHOD AND APPARATUS FOR ABSOLUTE INTERFEROMETRIC TESTING OF PLANE SURFACES, U.S. Pat. No. 5,106,194, 1992

6. G.Schulz, ABSOLUTE FLATNESS TESTING BY THE ROTATION METHOD USING TWO ANGLES OF ROTATION", *Applied Optics* 32, 1055 (1993)

7. G. Schulz, J. Grzanna, ABSOLUTE FLATNESS TESTING BY THE ROTATION METHOD WITH OPTIMAL MEASURING-ERROR COMPENSATION", *Applied Optics* 31, 3767 (1992)

8. C.Ai, J. C.Wyant, ABSOLUTE TESTING OF FLATS BY USING EVEN AND ODD FUNCTIONS, *Applied Optics* 32, 4698 (1993)

9. C. J. Evans, R. N. Kestner, "TEST OPTICS ERROR REMOVAL", *Applied Optics* 35,1015 (1996)

10. C.Ai, J. Wyant, L. Z. Shao, R. E. Parks, "METHOD AND APPARATUS FOR ABSOLUTE MEASUREMENT OF ENTIRE SURFACES OF FLATS", U.S. Pat. No. 5,502,566, 1996

11. K. Freischlad and C. L. Koliopoulos, "FOURIER DESCRIPTION OF DIGITAL PHASE-MEASURING INTERFEROMETRY", *Journal Optical Soc. Am.A,* Vol. 7, 542–551 (1990)

12. W. H. Press, B. P.Flannery, S. A. Teukolsky and W. T. Vetterling, "NUMERICAL RECIPES IN C", *Cambridge University Press*. Cambridge 1988.

Other than the Kuchel article, all of the techniques referenced in the above articles are based on what is known as the classic 3-flat test. For the 3-flat test, three flats are intercompared interferometrically in different combinations, using a Fizeau interferometer, with a short cavity between the reference surface and the test surface. The measurements of the three flats, labeled A, B and C, are carried out in the following manner:

Measurement $M_1$: reference surface=A, test surface=C

Measurement $M_2$: reference surface=B, test surface=C

Measurement $M_3$: reference surface=B, test surface=A

A numerical combination of the three measured surface maps, $M_1$, $M_2$, and $M_3$, allows the determination of the absolute one-dimensional surface profile along one diameter of each surface. Outside of that line, no absolute surface data are obtained. These previously described techniques for absolute testing represent one or more of the following shortcomings (A to C):

(A) An assumption or approximation, about the surface shape of at least one flat has to be made. Thus, the test is absolute only if the surface actually follows that assumption. For example, the above article No. 3, by B. S. Fritz, assumes that the surface shape is adequately represented by an expansion in Zernike-polynomials; and the three articles listed above as references 8, 9 and 10, assume that certain angular frequencies are not present.

(B) The spatial resolution of the two-dimensional map is either coarse, or the error in the absolute maps, due to measurement errors in the measured maps $M_1, \ldots M_m$ is large. In this case, as noted in the articles of references 1, 2 and 4 above, discussion about a large error propagation factor from the measurement to the absolute map is made.

(C) A large amount of numerical computation is required as noted in reference No. 6 by G. Schulz.

The method described in reference No. 5, to M. Kuchel is based on measurements in a folded beam path, where the surfaces to be tested constitute the two fold mirrors and the return mirror. Measurements at different deflection angles at the fold mirrors are acquired. The folded beam requires the distance between the reference surface and the return mirror at the end of the beam path to be fairly large, that is, the test cavity must be long. The beam path in the test cavity is not in the common path section for the two beams. As a result, thermally induced refractive index variations of the air in this test cavity will induce measurement errors, which can be very noticeable for the air paths in question.

Techniques for the absolute testing of spherical surfaces are described in the article of reference No. 2 listed above, and also in the following articles:

List of Articles

13. J. H.Bruning, D. R. Herriott, J. E. Gallagher, D. P. Rosenfeld, A. D. White, D. J. Brangaccio, "DIGITAL WAVEFRONT MEASURING INTERFEROMETER FOR TESTING OPTICAL SURFACES AND LENSES", *Applied Optics* 13, 2693 (1974)

14. K. E. Elssner, J.Grzanna, G. Schulz, "INTERFERENTIELLE ABSOLUTPRUFUNG VON SPHARIZITATSNORMALEN" *Optica Acta* 27, 563, (1980)

15. K. E. Elssner, R.Burow, J.Grzanna, R. Spolaczyk, "ABSOLUTE SPHERICITY MEASUREMENT" *Applied Optics* 28, 4649 (1989)

The techniques described in references 2 and above references 14 and 15 are related to an extended 3-flat test. Three spherical surfaces are tested in various combinations, where now the test cavity is not formed by two flats, but by two spherical surfaces whose centers of curvature coincide. Two of the three surfaces are concave; and one is convex; or all three surfaces are concave. Acquiring three measurements allows determining the sphericity along one diameter only, while a fourth measurement using a rotation or displacement of one surface provides the information needed for a full surface test. These techniques show some of the same shortcomings as the described flat tests, mainly the large error propagation factor, and high numerical computation effort for absolute maps with high spatial resolution.

In the technique described in reference No. 13 above, to J. F. Bruning et al., three measurements of two spherical surfaces are required. For one of these three measurements, one surface is placed in the focus spot of the converging test beam, called the cat's eye position. Because of the use of the cat's eye position, this technique provides full absolute surface maps without the error propagation issues of the other techniques. However, the cat's eye position poses strict requirements on the spatial coherence of the light source of the interferometer, which precludes measurements with reduced coherent noise due to the use of an extended source.

In all interferometric tests, it is necessary to distinguish between the contributions to the measurement data from the actual surface shape and from the alignment of the set-up. For the flatness test, the alignment of the set-up can introduce a tilt-term to the measurement data; whereas for the sphericity test, the alignment contributions can consist of a tilt-term and a focus-term. These terms usually are removed from the results, since they only represent the alignment contributions. This means, in particular, that the absolute radius of curvature of spherical surfaces is not determined in the sphericity test, but only the deviation of the surface from an ideal, best-fitting sphere.

It is desirable to provide a method and a device for the absolute interferometric measurement of two-dimensional maps of flat and spherical surfaces, which does not rely on assumptions about the-shape of the surfaces to be tested, which has low error propagation factor even for surface maps with high spatial resolution, which requires only a moderate amount of computation, and which works for flats with a short test cavity for the reduction of environmental disturbances.

SUMMARY OF THE INVENTION

It is an object of this invention to provide an improved method and apparatus for absolute interferometric measurement of flat and spherical surfaces.

It is another object of this invention to provide an improved method and device utilizing an extended 3-flat test for producing absolute interferometric measurement of flat and spherical surfaces.

It is an additional object of this invention to provide an extended 3-flat test employing a phase-shifting Fizeau interferometer in combination with an improved data processing method for providing absolute interferometric measurement of flat and spherical surfaces.

It is yet another object of this invention to provide a device for absolute interferometric measurement of flat and spherical surfaces utilizing an extended 3-flat test where an adjustable test piece mount is provided to allow for adjustment of the tip/tilt of the test surface, adjustment of the centration into orthogonal directions normal to the test beam, and a rotation adjustment with an axis normal to the test surface.

It is yet an additional object of this invention to provide an adjustable test piece mount for absolute interferometric measurement of spherical surfaces, providing for adjustment of the tip/tilt of the test surface, adjustment of the centration into orthogonal directions normal to the test beam, adjustment of the rotation with an axis normal to the test surface, and adjustment of the test piece position parallel to the test beam axis.

In accordance with a preferred embodiment of this invention, the absolute interferometric measurement of either planar or spherical surfaces employs a modification of an extended 3-flat test. This test includes the step of first employing a phase-shifting interferometer with a reference surface position and a test surface position. A first test piece A is placed in the reference surface position and a second test piece C is placed in the test surface position of the interferometer. The interferometer then is used to produce a first measured difference map of the first and second test pieces, A and C. Next, the first test piece A is replaced with a third test piece B; and the interferometer again is used to produce a second measured difference map of the third test piece B and the second test piece C. Then, the second test piece C at the test position is replaced with the first test piece A. Once again, the interferometer is used to produce a third measured difference map of the third test piece B (in the reference surface position) and the first test piece A (now in the test surface position of the interferometer). At least two, and preferably more, additional rotational positions of the test piece A in the test position of the interferometer then are measured by rotating the test surface A by a known angle; and subsequent measured difference maps of the rotated first test piece A (in the test surface position) and the third test piece B (in the reference surface position) are produced. Then the difference maps between these subsequent measurements and the third measured difference map are calculated. These calculated difference maps constitute rotationally sheared surface maps of the part A where the contribution of the surface of the test piece B is eliminated.

In a more specific implementation of the preferred embodiment of the invention, the shearing reconstruction of the rotationally sheared surface maps of part A is effected by first remapping the calculated difference maps, containing only the rotationally sheared surface maps of part A, into a circular coordinate system. After this has been done, these remapped difference maps are Fourier-transformed with respect to the angular coordinate to obtain the angular frequency spectrum. A multiplicative filter is applied to these spectra, which then are combined in a weighted summation. This summed angular frequency spectrum is then inversely Fourier-transformed to obtain the rotationally non-symmetric part of surface A. This result is combined with further processing of the first, second and third measured difference maps to yield the absolute surface maps of all three of the parts involved, where no assumptions about the surf shapes are required.

BRIEF DESCRIPTION OF THE DRAWINGS

FIGS. 5A, 5B and 5C illustrate a rotationally sheared map made in accordance with the measurement and processing illustrated in FIGS. 3 and 4;

DETAILED DESCRIPTION

Figures 1, 2:
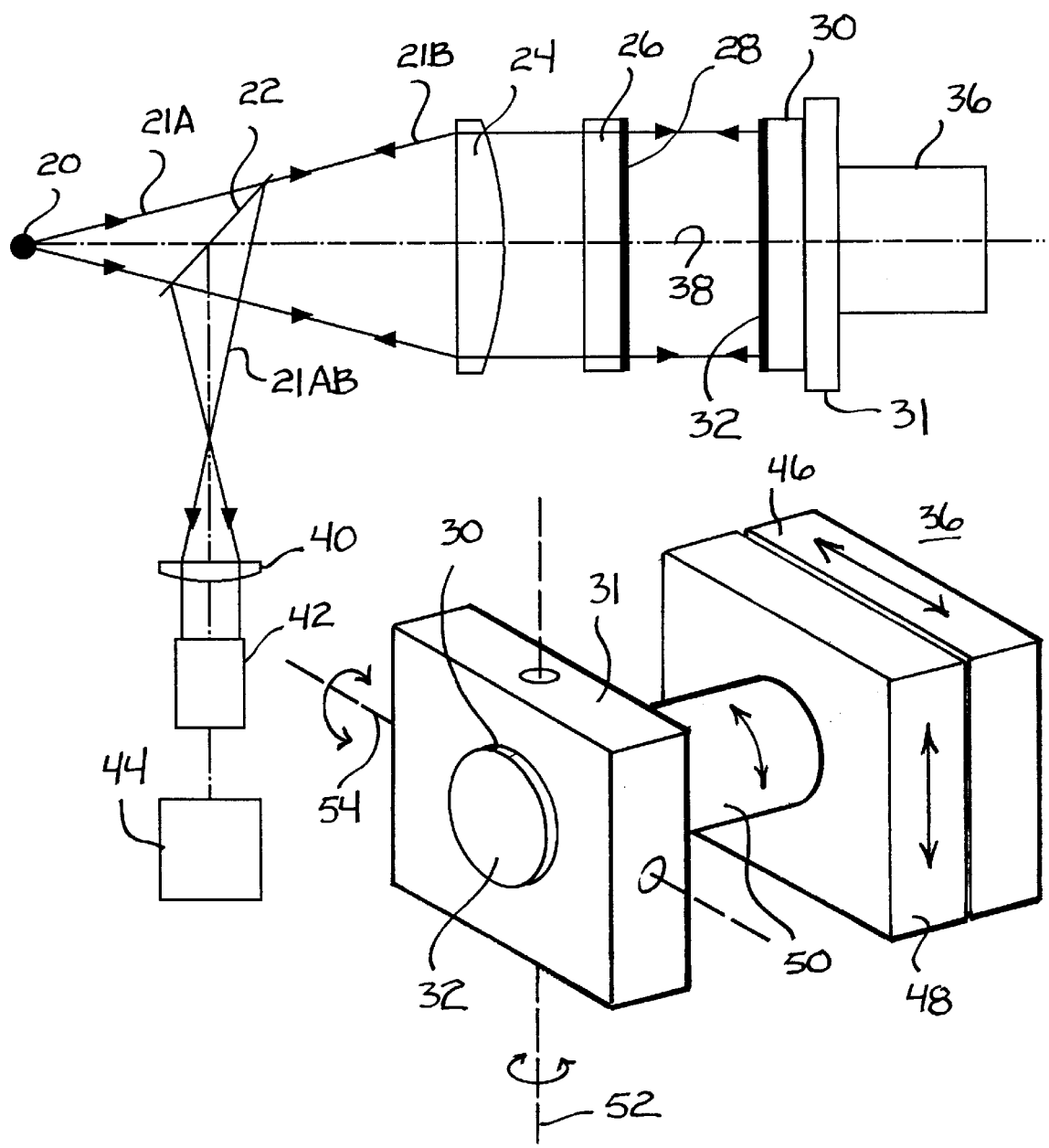
FIG. 1 is a diagrammatic representation of a Fizeau interferometer for flat testing in accordance with the method of a preferred embodiment of the invention.
FIG. 2 is a more detailed diagrammatic representation of a test piece mount used in the interferometer of FIG. 1.

Reference now should be made to the drawings, in which the same reference numbers are used in the different figures to designate the same components. FIG. 1 is a diagrammatic representation of a Fizeau interferometer used for an absolute flatness test. This interferometer includes an effective light source 20, which emits a diverging beam of light 21A. The light source 20 can be a physical source, or a re-imaged source from a different physical source, and may be a laser or other light source.

The beam of light 21A passes through a beam splitter 22 to a collimating lens 24. After passing through the collimating lens 24, the beam is collimated and travels to a transparent reference flat 26 having a reference surface 28. The surface 28 represents the reference surface where part of the illuminating beam is reflected as a reference beam back to the collimator lens 24. The non-reflected part of the beam is called the test beam. It propagates to the surface 32 of the test flat 30 where it is reflected. This surface 32 is called the test surface. The test flat 30 is mounted on a plate 31 of a test piece mount 36. The returning test beam propagates through the reference flat 26/28 to the collimator lens 24.

After passing through the collimator lens 24, both the test beam and the reference beam are converging and traveling on the same beam path 21B to the beam splitter 22, where they are both reflected and directed to an imaging lens 40. The imaging lens 40 forms a sharp image of both the test surface 32 and the reference surface 28, and supplies this image to the interferogram detector 42, where both beams interfere.

Typically, the interferogram detector 42 consists of an electronic camera which detects the interferograms and converts them to an electronic signal. This signal then is routed to a digitization and computer circuit 44, where it is made available for further processing.

The phase of the interference fringes in the interferogram detected by the detector 42 contains the information about the test surface 32 and the reference surface 28. This information is extracted with very high accuracy using a phase-shifting data acquisition and reduction technique of the type disclosed in article 11 mentioned previously by K. Freischlad and C. L. Koliopoulos, "FOURIER DESCRIPTION OF DIGITAL PHASE MEASURING INTERFEROMETRY".

For the phase-shifting data acquisition technique, the fringe phase is modulated while several camera frames at the interferogram detector 42 are acquired in the computer 44. This phase modulation may be effected by moving the reference flat surface 28 parallel to the beam. In that case, the reference flat is mounted on a mechanism allowing for the motion typically generated by Piezo electric actuators. Alternatively, the test flat 30/32 may be moved for the phase shifting with an equivalent arrangement. Another alternative for the phase modulation consists of varying the wavelength of the light at the light source 20 used in the interferometer shown in FIG. 1. An example for a suitable light source in such a case is a diode laser.

After the phase shifting data processing, the measurement map m (x,y) for the x and y coordinates is obtained as follows:

$$m(x,y) = h_{reference}(-x,y) + h_{test}(x,y) \tag{1}$$

Where $h_{reference}$ and $h_{test}$ are the two-dimensional surface height distributions of the reference surface 28 and the test surface 32, respectively. The Cartesian (x,y) coordinate system for the surface height distribution is defined here in the plane of the respective surface when viewed from the outside of the substrate, as is the case for the test surface. Since the reference surface 28 is viewed through the substrate 26, it appears to be mirrored. This mirror-axis is defined as the y-axis; and the mirror-operation consists of replacing x by -x. Hence the mirrored reference surface $h_{reference}(-x,y)$ is combined with the direct test surface $h_{test}(x,y)$ of the surface 32 to result in the measurement map m(x,y).

Figure 3:
FIG. 3 illustrates the measurement combinations and coordinate systems for eight measurements using the apparatus of FIGS. 1 and 2.
Figure 3:
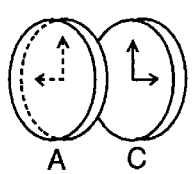
Figure 3:
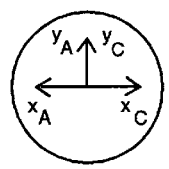
Figure 3:
Figure 3:
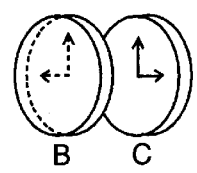
Figure 3:
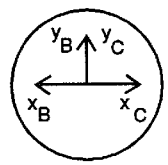
Figure 3:
Figure 3:
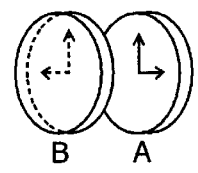
Figure 3:
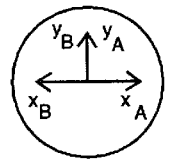
Figure 3:
Figure 3:
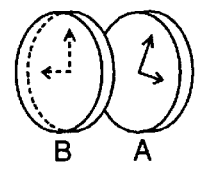
Figure 3:
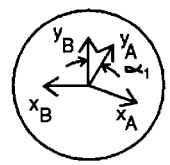
Figure 3:
Figure 3:
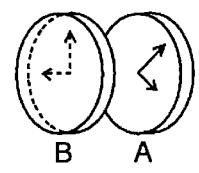
Figure 3:
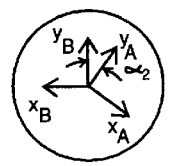
Figure 3:
Figure 3:
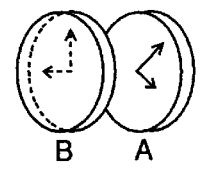
Figure 3:
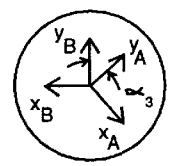
Figure 3:
Figure 3:
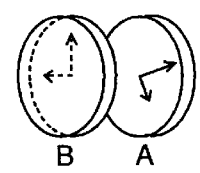
Figure 3:
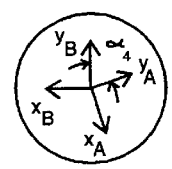
Figure 3:
Figure 3:
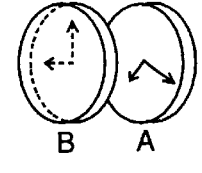
Figure 3:
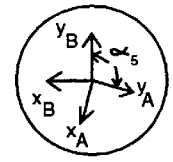

Three flats, labeled A, B and C, with respective surface height distributions $h_A$ (x,y), $h_B$ (x,y), and $h_C$ (x,y), are required for this procedure. These flats are used in the following combinations as reference flat and test flats, with a two-dimensional measurement map $m_j$ (x,y) acquired in each of the different configurations. This is shown in FIG. 3 illustrating a total of eight measurements. Although eight measurements are used in the present example, the preferred embodiment of the method and apparatus of this invention may use at least five and more than eight measurements, if desired. The eight measurements shown in FIG. 3 are as follows:

Measurement $m_1$:reference surface=A, test surface=C
Measurement $m_2$:reference surface=B, test surface=C
Measurement $m_3$:reference surface=B, test surface=A (as mentioned above, at least two more rotational positions of flat A are measured)
Measurement $m_4$:reference surface=B, test surface=A rotated by $\alpha_1$,
Measurement $m_5$:reference surface=B, test surface=A rotated by $\alpha_2$,
Measurement $m_6$:reference surface=B, test surface=A rotated by $\alpha_3$,
Measurement $m_7$:reference surface=B, test surface=A rotated by $\alpha_4$,
Measurement $m_8$:reference surface=B, test surface=A rotated by $\alpha_5$.

In summary, it can be seen that for any subsequent measurements, up to the maximum number of measurements made, the final measurement is:

Measurement $m_m$:reference surface=B, test surface=A rotated by $\alpha_{m-3}$.

For simplicity, the center of rotation used in the apparatus of FIG. 1, and as illustrated in the diagrammatic representation in FIG. 3, is made to coincide with the origin of the (x,y)-coordinate system.

In order to facilitate obtaining accurate measurements in the different configurations, a test piece mount 36 as shown in FIG. 2 is employed to provide five degrees of freedom for the adjustments used. As shown in FIG. 2, the test flat 30 with its test surface 32 is mounted on it in any suitable fashion conventionally used with a Fizeau interferometer. The mount 31 for the test flat is interconnected in the mount, with an element 50 for rotating the mount 31 about an axis normal to and centered to the test surface 32. Tip (y) and tilt (x) of the test surface are accomplished, respectively, by additional rotating elements 54 and 52; and the x and y centration parallel to the test surface is accomplished by the blocks labeled 46 and 48, respectively, in FIG. 2. These various adjustments may be accomplished in any suitable manner, and are illustrated diagrammatically in FIG. 2, since the manner of implementing the different degrees of adjustment or degrees of freedom may be accomplished mechanically by a variety of different techniques. The rotation adjustment, effected at 50, is used to set the different rotation angles a made in the measurements described above in conjunction with FIG. 3. The tip/tilt adjustments 54/52 are used to minimize the number of fringes into the interferogram to avoid retrace errors. The centration adjustments 46 and 48 are used to center the axis of rotation with respect to the interferometer aperture.

After all of the measurements $m_1$ to $n_m$ are acquired, the data are analyzed in the computer 44 to obtain the individual surface maps. Since the measurements $m_1$, $m_2$, and $m_3$ are given by the following:

$$m_1 (x,y) = h^x_A (x,y) + h_C (x,y) \tag{2}$$

$$m_2 (x,y) = h^x_B (x,y) + h_C (x,y) \tag{3}$$

$$m_3 (x,y) = h^x_B (x,y) + h_A (x,y) \tag{4}$$

The individual surface maps may be expressed as:

$$h_A (x,y) = h_{Aodd} (x,y) + c_1 (x,y) \tag{5}$$

$$h_B (x,y) = h_{Aodd} (x,y) - c^x_2 (x,y) \tag{6}$$

$$h_C (x,y) = h_{Aodd} (x,y) + c_3 (x,y) \tag{7}$$

with:

$$c_1(x,y) = \tfrac{1}{2}(m_1(x,y) - m_2(x,y) + m_3(x,y)) \tag{8}$$

$$c_2(x,y) = \tfrac{1}{2}(m_1(x,y) - m_2(x,y) - m_3(x,y)) \tag{9}$$

$$c_3(x,y) = \tfrac{1}{2}(m_1(x,y) + m_2(x,y) - m_3(x,y)) \tag{10}$$

The superscript x signifies the x-flip operation, or mirroring operation, replacing x by –x, i.e.:

$$h^x(x,y) = h(-x,y) \tag{11}$$

The map $h_{A,odd}$ is the odd part of the surface height map of surface A with respect to the mirror operation about the y-axis, i.e.:

$$h_{A,odd}(x,y) = \tfrac{1}{2}(h_A(x,y) - h_A^x(x,y)) \tag{12}$$

Figure 4:
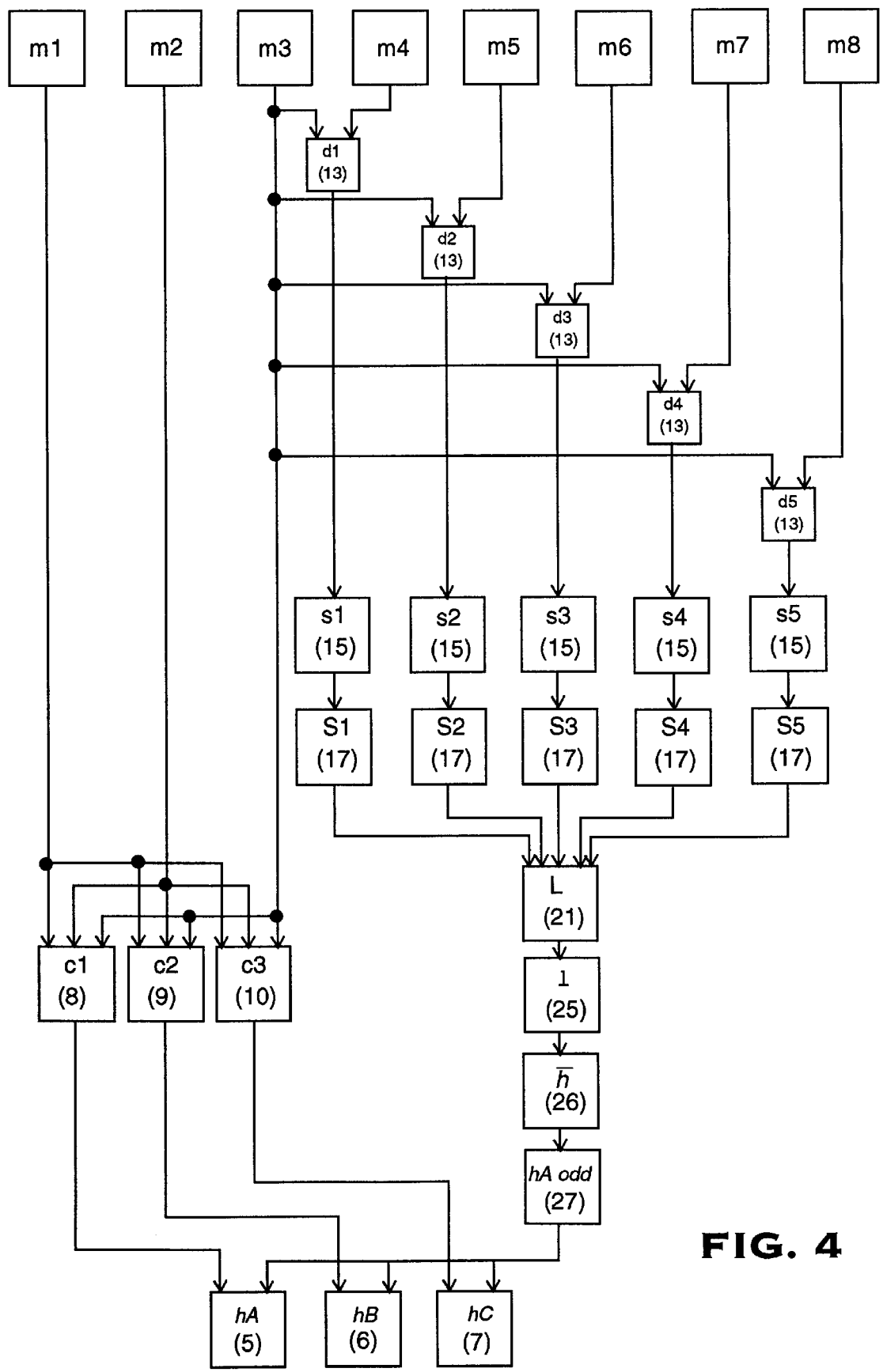
FIG. 4 illustrates the data flow for the processing of the eight measurements of FIG. 3.

The data analysis is done in two sections; and FIG. 4 illustrates the overall data flow. In order to correlate FIG. 4 with the preceding and subsequent discussion, the relevant equation numbers are listed in parentheses by the same numbers given above and below with the data maps. In the first section, the measurement maps $m_1$, $m_2$, and $m_3$ are combined to obtain the maps shown in the lower left hand corner of FIG. 4, $c_1(x,y)$, $c_2(x,y)$ and $c_3(x,y)$ according to equations (8), (9) and (10) given above.

In the second section of FIG. 4, the odd part of surface A, $h_{Aodd}(x,y)$ is determined by a special reconstruction technique in the angular frequency domain. For that purpose, first the difference maps $d_j$ (x,y) are computed for j=1 to M−3 with:

$$d_j(x,y) = m_{3+j}(x,y) - m_3(x,y) \tag{13}$$

Since the contribution of the reference surface is the same in both maps combined for each difference map, it is eliminated from the difference yielding:

$$d_j(x,y) = h_A^{aj}(x,y) - h_A(x,y) \tag{14}$$

Where the superscript a denotes a rotation by the angle α around the origin of the x,y coordinate system. Thus, the difference map $d_j$ (x,y) is equal to the difference between the surface $h_A$ (x,y) rotated by the angle $\alpha_j$ and the non-rotated surface $h_A$ (x,y). The difference maps $d_j$ (x,y) are called rotationally sheared maps of $h_A$ (x,y) and the angle $\alpha_j$ is called the shear angle.

Continuing to refer to FIG. 4, in the next step the difference maps $d_j$ (x,y) are re-mapped into a polar coordinate system, with coordinates r and θ, where r is the distance between the origin of the x,y-coordinate system and the point (x,y) and θ is the angle between the y-axis and the connecting line from the origin of the x,y-coordinate system to the point (x,y). This coordinate transformation is carried out by using commonly known interpolation methods. The preferred embodiment consists of bi-cubic spline interpolation. An implementation example for obtaining such a bi-cubic spline interpolation is given in the book mentioned above, NUMERICAL RECIPES IN C by W. H. Press, B. P. Flannery, S. A. Teukolsky and W. T. Vetterling. As a consequence, re-mapped difference maps $s_j$ (r,θ) for J=1 to M−3 are obtained as follows:

$$d_j(x,y) \rightarrow s_j(r, \theta) \tag{15}$$

The difference maps $s_j$ (r,θ) contain the re-mapped surface height distributions of surface A in the following manner, as illustrated in FIGS. 5A to 5C:

$$s_j(r,\theta) = h_A(r,\theta+\alpha_j) - h_A(r,\theta) \tag{16}$$

As can be seen in FIGS. 5A to 5C, the rotational shear occurred only in the e coordinate. The shearing reconstruction (FIGS. 5A, 5B and 5C) therefore is necessary only for the θ-coordinate. This is readily apparent from an examination of FIGS. 5A, 5B and 5C. To reconstruct the rotational shear maps $s_j$ (r,θ) for each radius value r, a one-dimensional Fourier-transform is carried out in the θ direction, as follows:

$$S_j(r, f_\theta) = FT\{s_j(r, \theta)\} \tag{17}$$

Where FT represents the Fourier-transform operator in the θ coordinate, and $f_\theta$ is the angular frequency coordinate in Fourier-space. An implementation example for such a fast Fourier-transform algorithm is given in the book "NUMERICAL RECIPES IN C" mentioned above. In the Fourier-domain, the spectra $S_j$ of the difference maps are equal to the filtered spectrum H of the surface:

$$S_j(r, f_\theta) = \delta(\alpha_j, f_\theta) H(r, f_\theta) \tag{18}$$

With the differencing filter δ being:

$$\delta(\alpha_j, f_\theta) = (e^{2\pi i \alpha_j f_\theta} - 1) \tag{19}$$

Thus, the partial spectrum $H^P_j(r,f_\theta)$ of the reconstructed surface height maps can be calculated from each difference spectrum $S_j(r,f_\theta)$ by:

$$H^P_j(r, f_\theta) = \frac{1}{\delta(\alpha_j, f_\theta)} S_j(r, f_\theta) \tag{20}$$

Where the reconstruction only can be carried out at the frequencies where the filter $\delta(\alpha_j, f_\theta)$ is unequal to zero. The differencing filter is zero at frequencies where the shear angle is equal to an integer multiple of the periods corresponding to these angular frequencies. For a given shear, the information about the surface height map is lost at these angular frequencies, and cannot be recovered. In addition, for frequencies where the absolute value of the differencing filter is very small, its inverse use in the reconstruction is very large, and the error propagation factor is very large.

Consequently, the result at these angular frequencies becomes extremely sensitive to measurement noise and other measurement errors.

As a result, a combination of different maps with various rotational shear angles is used; so that the zero-locations of their differencing filters do not coincide. Then, only the angular frequency $f_\theta=0$ is undetermined and cannot be reconstructed, since it corresponds to the constant term of the height distribution around a circle for a given radius r. This constant term is always eliminated by the differencing, and cannot be recovered. However, for the final combination only the odd part of the reconstructed map is required. The constant term at frequency zero is even. Therefore, it is not required for the further processing and does not need to be reconstructed.

The linear combination and filtering of the spectra $S_j$ (r,θ) is carried out in the following manner to yield the weighted super position L (r, $f_\theta$):

$$L(r, f_\theta) = \sum_{j=1}^{M-3} w_j(f_\theta) \frac{S_j(r, f_\theta)}{\delta(\alpha_j, f_\theta)} \tag{21}$$

Where the normalized weights $w_j$ ($f_\theta$) are given by:

$$w_j(f_\theta) = \frac{\rho_j(f_\theta)}{n(f_\theta)} \tag{22}$$

Here n ($f_\theta$) is the normalization factor:

$$n(f_\theta) = \sum_{j=1}^{M-3} \rho_j(f_\theta) \tag{23}$$

For a given number of difference maps and a given shear angle for each difference map, the weights are chosen such that the overall error propagation factor is minimized. The optimum choice which minimizes the mean quadratic difference between the reconstructed map and the true map, if the measurement maps $m_1$ to $m_m$ are corrupted by random additive noise of zero mean is given by:

$$\rho_j(f_\theta) = |\delta(\alpha_j, f_\theta)|^2 \tag{24}$$

Performing for each value of r the one-dimensional inverse Fourier-transform $FT^{-1}$ on L(r,$f_\theta$) results in the reconstructed surface height map l (r,θ), that is:

$$l(r,\theta) = FT^{-1}\{L(r, f_\theta)\} \tag{25}$$

Where only the zero angular frequency component of l (r,θ) is missing.

Finally, the surface height map l (r, θ) in the circular coordinate system is re-mapped back into the Cartesian x,y coordinate system, that is, using a bi-cubic spline interpolation:

$$l(r, \theta) \rightarrow \bar{h}(x,y) \tag{26}$$

As mentioned above, the lack of the zero angular frequency component does not affect the odd part, and the following is obtained:

$$h_{A,odd}(x,y) = \frac{1}{2}(\bar{h}(x,y) - \bar{h}^x(x,y)) \tag{27}$$

An alternate way of determining $h_{A,odd}$ from L(r,$f_\theta$) consists of using not the full inverse Fourier-transform to obtain l (r,θ), but to only carry out a Sine-transform providing directly $l_{odd}$ (r,θ), which then is re-mapped into $h_{A,odd}$ (x,y).

This result for $h_{A_{odd}}$ (x,y) from the second processing section is combined with the data maps $c_1$ (x,y), $c_2$ (x,y) and $c_3$ (x,y) from the first processing section to yield the absolute surface maps, as shown at the bottom of FIG. 4, $h_A$ (x,y), $h_B$ (x,y), and $h_C$ (x,y) for all the surfaces under test according to the above equations (5), (6), and (7).

For the data acquisition and processing of the rotational shear maps, the number of measurement maps $m_3$ to $m_m$ with a rotated test piece at the test piece mount 36 has to be selected, as well as their respective rotation angles. The following criteria are applied for that selection.

(1) At least two rotational shear maps are required. These are the maps beyond the maps $m_1$, $m_2$ and $m_3$ which form the initial portion of the mapping process. This is necessary to obtain low overall error propagation, as well as more uniform error propagation for low as well as high angular frequencies.

(2) The rotation angles, $\alpha_1$ to $\alpha_{m-3}$ are chosen such that the difference factors for the individual shear maps do not all have a zero-point at the same angular frequency. Otherwise, this particular frequency cannot be reconstructed.

(3) The number and values of rotation angles are chosen such that the error propagation factor from the shearing reconstruction of $h_{A_{odd}}$ is below a desired threshold. This error propagation factor is defined as the ratio of the variance of the reconstructed map $h_{A,odd}$ (x,y) to the variance of measurement noise on the individual measurement maps $m_3$ to $m_m$. For random additive noise of zero-mean with equal variance for all measurement maps, the error propagation factor $h_{A,odd}$ (x,y) is:

$$epf_{rot} = \frac{1}{2N} \sum_{n=0}^{N-1} \left( \sum_{j=1}^{M-3} \left| \frac{w_j(f_n)}{\delta(\alpha_j, f_n)} \right|^2 + \left| \sum_{j=1}^{M-3} \frac{w_j(f_n)}{\delta(\alpha_j, f_n)} \right|^2 \right) \quad (28)$$

The quantities of $\delta$ and $w_j$ are defined in equations (19) and (22) above. N is the number of angular samples, that is, there are N discrete equispaced data points along each circle of given radius r (see FIGS. 5A to 5C) for the numeric processing, and also N discrete equispaced angular frequencies $f_n$ in the Fourier-domain.

(4) The number and values of rotation angles are chosen such that the distribution of the reconstruction error over the individual angular frequencies is close to uniform. The error propagation factor for each angular frequency $f_n$ is given by:

$$epf_r(f_n) = \sum_{j=1}^{M-3} \left| \frac{w_j(f_n)}{\delta(\alpha_j, f_n)} \right|^2 + \left| \sum_{j=1}^{M-3} \frac{w_j(f_n)}{\delta(\alpha_j, f_n)} \right|^2 \quad (29)$$

In a preferred embodiment of the invention, operated with the apparatus shown in FIGS. 1 and 2 and in the manner described above in conjunction with FIGS. 3 through 5, the measurement maps consist of 512×512 data points in the (x,y)-coordinate system. In order to preserve the full sampling resolution of these maps also in the (r,θ)-coordinate system, the number N of angular samples needs to be larger than 512*n=1608. For efficient numerical calculations with fast Fourier-transform routines, N=2048 is chosen. A total of M=8 measurements are acquired, that is, five rotational shear maps are used in addition to the initial basic three measurement maps. The following set of shear angles shows good performance, namely: $\alpha_1$=0.35°, $\alpha_2$=1.40°, $\alpha_3$=5.62°, $\alpha_4$=22.5°, $\alpha_5$=90.0°. Other shear angles also provide good performance. The error propagation factors for the final absolute maps $h_A$(x,y), $h_B$ (x,y), and $h_C$ (x,y) are given by:

$$epf_A = 1 + epf_{rot} \quad (30)$$

$$epf_{B,C} = \frac{1}{2} + epf_{rot} \quad (31)$$

For the preferred embodiment described above in FIGS. 1 through 5C, error propagation factors of $epf_A$=1.2 and $epf_B$=0.7 are obtained. Hence, the variance of the final absolute maps is about the same as the noise variance on the individual interferometric measurement maps. The spatial resolution of 512×512 points is maintained in these final maps. No assumption about the test surfaces, other than adequate sampling during the data acquisition, is required for the data processing to provide the absolute surface height maps.

Figures 6A, 6B:
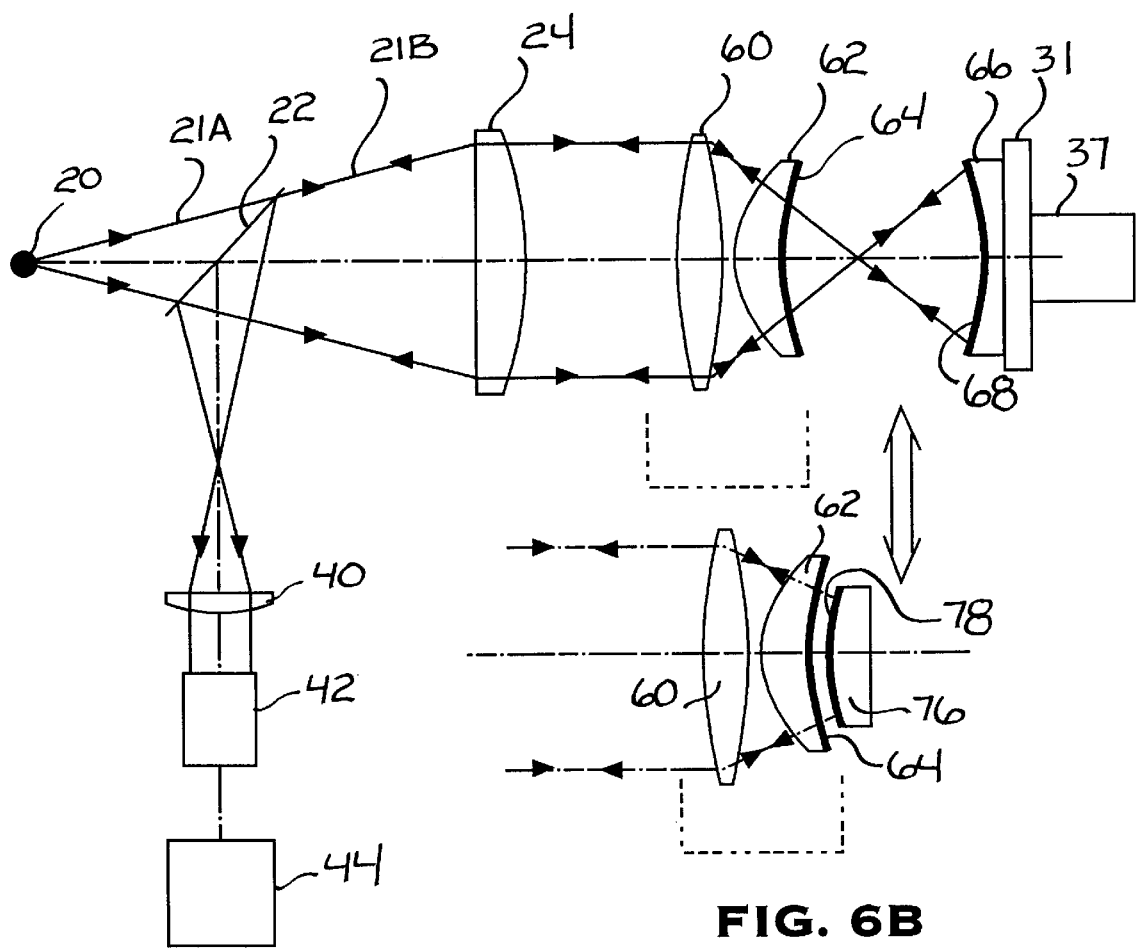
FIGS. 6A and 6B are diagrammatic representations of a Fizeau interferometer set up for spherical testing for use with the method of the preferred embodiment of this invention.

Reference now should be made to FIGS. 6A and 6B. For the testing of spherical surfaces, the Fizeau interferometer shown in FIG. 1 may be combined with a focusing lens 60 and a concave reference element 62, having a reference surface 64. A concave test piece or test element 66 is provided having a test surface 68 in place of the test flat 30 and test surface 32 of the apparatus shown in FIG. 1. In many practical cases, this combination of focusing lens and reference element is placed in one mechanical assembly, which can be removed and replaced as a whole. This assembly is called a transmission sphere. The last surface of the reference element, namely the surface 64, constitutes the reference surface where the reference beam is reflected. The focusing lens 60 makes the illuminating beam convergent such that it impinges normally on the reference surface 64. In other words, the center of curvature of the illuminating beam at the reference surface 64 coincides with the center of curvature of the reference surface 64 itself. Thus, the reflected reference beam (21B) is collimated again after passing through the focusing lens 60. The test piece 66 is placed such that the test beam transmitted at the reference surface 64 also impinges normally on the test surface 68. As a consequence, the reflected test beam from the test surface 68 also is collimated after passing again through the focusing lens 60. The test beam and the reference beam travel together at 21B from the collimating lens 24 to the interferogram detector 42 in the same manner as described above for flat testing in conjunction with the embodiment shown in FIG. 1.

Figure 7:
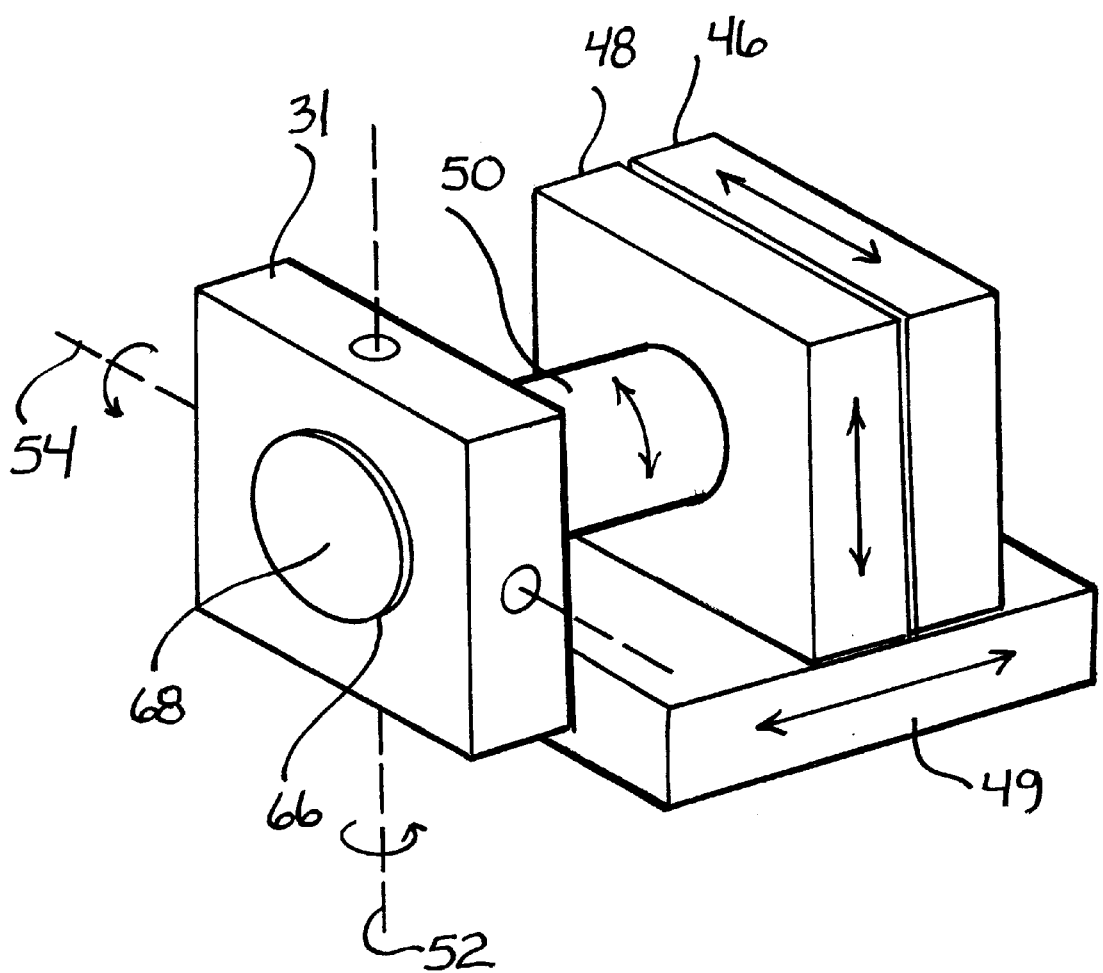
FIG. 7 is a detailed diagrammatic representation of a test piece mount used in conjunction with the apparatus shown in FIGS. 6A and 6B.

The centers of curvature of the reference surface 64 and the test surface 68 must coincide in order to minimize the number of fringes in the interferogram produced at the interferogram detector 42, and, hence, minimize retrace errors. For that purpose, an additional degree of freedom for adjustment is provided in the test piece mount 37 for sphericity testing, which is not used in the flat test mount shown in FIG. 2. This additional degree of freedom is illustrated in FIG. 7, where it can be seen that axial displacement by the portion 49 of the test piece parallel to the optical axis of the test beam is provided. All of the other degrees of freedom or adjustment, which are present in the flat surface testing apparatus of FIGS. 1 and 2 are similarly employed with the test piece mount 37 shown in FIGS. 6A and 7. Thus, tip and tilt adjustments are shown at 52 and 54, x and y centration parallel to the plane normal to the center axis of the test surface 68 is effected by the elements 46 and 48, rotation adjustment is effected at 50 to set the different rotation angles for measurements made with the apparatus of FIGS. 6A, 6B and 7 in the same manner described above in conjunction with FIGS. 3, 4 and 5A to 5C. The tip/tilt adjustments are used to minimize the number of fringes in the interferogram to avoid retrace errors. The centration adjustments are used to center the axis of rotation with respect to the interferometer aperture; and the axial displacement shown at 49 moves the test piece parallel to the optical axis to obtain the location which causes the beam of light to impinge normally on the surface 68.

The absolute sphericity test is conducted with the same sequence of maps which have been described above in conjunction with the flatness test of FIGS. 1 and 2. Parts A and B are shown in FIG. 6A to each have a concave test surface; and part C, as used in this test, may have either a concave or a convex test surface. The parts with concave surfaces can be treated independently or as part of a transmission sphere. The same sequence of measurement and data processing steps is carried out as for the flat testing described previously, such that now the absolute sphericity maps $h_A(x,y)$, $h_B(x,y)$, and $h_C(x,y)$ are obtained from the measurement maps $m_1(x,y)$ to $m_m(x,y)$.

FIG. 6B illustrates the difference which is employed in the tests involving surface B where the concave surface shown in FIG. 6A for the test surface, namely surface 68, has been replaced with a test piece 76 having a convex test surface 78. In all other respects, the interferometer is operated to perform the tests according to the method in the same manner described above in conjunction with the apparatus shown in FIGS. 1 and 2 and shown and described above in conjunction with FIGS. 6A and 7.

The system and method described above and shown in the drawings functions to provide the desired absolute surface maps in situations where the flat or test element, which changes position from the reference position to the test position (referred to above as part "A"), also is the one which is rotated to obtain the rotationally sheared surface maps. It should be noted, however, that this part (Part "A") also could be rotated in the configuration of the first measurement, namely when the part "A" is in the reference surface position, so long as the flip of the coordinate system is accounted for. For that to occur, the rotation mount also then would have to be on the reference part holder, with the rotation of this part relative to the test part holder being accomplished. Measurements of the same type, for producing the saute results will occur with this configuration as well. Consequently, the foregoing description specifically mentioning rotation of "part A" in the test position of the interferometer is intended equally to cover the situation noted here, where the rotated part is rotated in what is commonly referred to as the reference position of the interferometer.

The foregoing description of the preferred embodiment of the invention is to be considered as illustrative and not as limiting. Various changes and modifications will occur to those skilled in the art for performing substantially the same function, in substantially the same way, to achieve substantially the same result, without departing from the true scope of the invention as defined in the appended claims.

What is claimed is:

1. A method for absolute surface testing of planar or spherical surfaces including the steps of:

employing a phase shifting interferometer with a reference surface position and a test surface position;

placing a first test piece A in the reference surface position;

placing a second test piece C in the test surface position;

using the interferometer to produce a measured difference map $m_1$ of the first and second test pieces;

replacing the first test piece A with a third test piece B in the reference position and using the interferometer to produce a measured difference map $m_a$, of the third and second test pieces;

the second test piece C with the first test piece A in the test surface position and using the interferometer to produce a measured difference map $m_3$, of the third (B) and first (A) test pieces;

rotating the test piece (A) at the test surface position by at least two additional different predetermined angular amounts and using the interferometer to produce measured difference maps $m_4 \ldots m_{m-3}$, of the third (B) and first (A) test pieces at the positions of each of the at least two different predetermined angular amounts positions;

Calculating rotationally sheared surface maps of the first test piece A; and using the measured difference maps and the rotationally sheared surface maps to produce absolute surface maps of the first (A), second (B) and third (C) test pieces.

2. The method according to claim 1 wherein the first, second and third test pieces are flat test pieces.

3. The method-according to claim 2 wherein the test surface is carried on apparatus which permits the further step of adjusting the position of a test piece placed in the test surface position thereof relative to the reference surface position of the interferometer.

4. The method according to claim 3 wherein the step of adjusting the position of a test piece placed in the test position of the interferometer includes rotating, tilting and tipping as well as displacing the test piece in either of two orthogonal directions.

5. The method according to claim 4 wherein the step of using the measured difference maps and the rotationally sheared surface maps to provide absolute surface maps of the first, second and third test pieces includes re-mapping the rotationally sheared surface maps into a circular coordinate system and Fourier transforming the re-mapped maps to obtain angular frequency spectra.

6. The method according to claim 5 further including the steps of:

applying a multiplicative filter to the angular frequency spectra to combine the spectra in a weighted summation;

inversely Fourier transforming the summed angular frequency spectrum to obtain the rotationally non-symmetric part of the surface of the first test piece A.

7. The method according to claim 6 wherein the individual absolute surface maps h are represented by the following equations $$h_A(x,y) = h_{A,odd}(x,y) + c_1(x,y)$$

$$h_B(x,y) = h_{A,odd}(x,y) - c_2^x(x,y)$$

$$h_C(x,y) = h_{a,odd}(x,y) + c_3(x,y)$$

with $$c_1(x,y) = \frac{1}{2}(m_1(x,y) - m_2(x,y) + m_3(x,y))$$

$$c_2(x,y) = \frac{1}{2}(m_1(x,y) - m_2(x,y) - m_3(x,y))$$

$$c_3(x,y) = \frac{1}{2}(m_1(x,y) + m_2(x,y) - m_3(x,y))$$

in a two-dimensional coordinate system (X,Y).

8. The method according to claim 7 further including the step of linear filtering and superposition as set forth in the following equation:

$$L(r, f_\theta) = \sum_{j=1}^{M-3} w_j(f_\theta) \frac{S_j(r, f_\theta)}{\delta(\alpha_j, f_\theta)}$$

where $s_j$ is the angular spectra of the rotationally sheared surface maps, $w_j$ is the normalized weights, $\delta(\alpha_j,f_\theta)$ is the differencing filter given by ($e^{2xi\alpha jfe}-1$).

9. The method according to claim 8 wherein the superposition is weighted according to the following equation:

$$w_j(f_\theta) = \frac{|\delta(\alpha_j, f_\theta)|^2}{\sum_{j=1}^{M-3} |\delta(\alpha_j, f_\theta)|^2}.$$

10. The method according to claim 9 wherein the phase-shifting interferometer used is a Fizeau interferometer.

11. The method according to claim 1 wherein the first, second and third test pieces have spherical surfaces.

12. The method according to claim 11 wherein the test surface is carried on apparatus which permits the further step of adjusting the position of a test piece placed in the test surface position thereof relative to the reference surface position of the interferometer.

13. The method according to claim 12 wherein the step of adjusting the position of a test piece placed in the test position of the interferometer includes rotating, tilting, tipping, axial moving, as well as displacing the test piece in either of two orthogonal directions.

14. The method according to claim 13 wherein the step of using the difference maps to provide absolute surface maps of the first, second and third test pieces includes re-mapping the difference maps into a circular coordinate system and Fourier transforming the re-mapped maps to obtain angular frequency spectra.

15. The method according to claim 14 further including the steps of:

applying a multiplicative filter to the angular frequency spectra to combine the spectra in a weighted summation;

inversely Fourier transforming the summed angular frequency spectrum to obtain the rotationally non-symmetric part of the surface of the first test piece A.

16. The method according to claim 15 wherein the individual surface maps are represented by the following equations $h_A(x,y)=h_{A,odd}(x,y)+c_1(x,y)$ $h_B(x,y)=h_{A,odd}(x,y)-c_2^x(x,y)$ $h_C(x,y)=h_{A,odd}(x,y)+c_3(x,y)$ with $c_1(x,y)=\frac{1}{2}(m_1(x,y)-m_2(x,y)+m_3(x,y))$ $c_2(x,y)=\frac{1}{2}(m_1(x,y)-m_2(x,y)-m_3(x,y))$ $c_3(x,y)=\frac{1}{2}(m_1(x,y)+m_2(x,y)-m_3(x,y))$ in a two-dimensional coordinate system (X,Y).

17. The method according to claim 16 further including the step of linear filtering and superposition as set forth in the following equation:

$$L(r, f_\theta) = \sum_{j=1}^{M-3} w_j(f_\theta) \frac{S_j(r, f_\theta)}{\delta(\alpha_j, f_\theta)}$$

where $s_j$ is the angular spectra of the rotationally sheared surface maps, $w_j$ is the normalized weights, $\delta(\alpha_j,f_\theta)$ is the differencing filter given by ($e^{2xi\alpha jf3}-1$).

18. The method according to claim 17 wherein the superposition is weighted according to the following equation:

$$w_j(f_\theta) = \frac{|\delta(\alpha_j, f_\theta)|^2}{\sum_{j=1}^{M-3} |\delta(\alpha_j, f_\theta)|^2}.$$

19. The method according to claim 18 wherein the phase-shifting interferometer used is a Fizeau interferometer.

20. The method according to claim 1 wherein the step of using the difference maps to provide absolute surface maps of the first, second and third test pieces includes re-mapping the difference maps into-a circular coordinate system and Fourier transforming the re-mapped maps to obtain angular frequency spectra.

21. The method according to claim 20 further including the steps of:

applying a multiplicative filter to the angular frequency spectra to combine the spectra in a weighted summation;

inversely Fourier transforming the summed angular frequency spectrum to obtain the rotationally non-symmetric part of the surface of the first test piece A.

22. The method according to claim 21 wherein the individual surface maps are represented by the following equations $h_A(x,y)=\frac{1}{2}h_{A,odd}(x,y)+c_1(x,y)$ $h_B(x,y)=\frac{1}{2}h_{A,odd}(x,y)-c_2^x(x,y)$ $h_C(x,y)=\frac{1}{2}h_{A,odd}(x,y)+c_3(x,y)$ with $c_1(x,y)=(m_1(x,y)-m_2(x,y)+m_3(x,y))$ $c_2(x,y)=(m_1(x,y)-m_2(x,y)-m_3(x,y))$ $c_3(x,y)=(m_1(x,y)+m_2(x,y)-m_3(x,y))$ in a two-dimensional coordinate system (X,Y).

23. The method according to claim 22 further including the step of linear filtering and superposition as set forth in the following equation:

$$L(r, f_\theta) = \sum_{j=1}^{M-3} w_j(f_\theta) \frac{S_j(r, f_\theta)}{\delta(\alpha_j, f_\theta)}$$

where $s_j$ is the angular spectra of the rotationally sheared surface maps, $w_j$ is the normalized weights, $\delta(\alpha_j,f_\theta)$ is the differencing filter given by $-(e^{2xi\alpha jf3}-1)$.

24. The method according to claim 23 wherein the superposition is weighted according to the following equation:

$$w_j(f_\theta) = \frac{|\delta(\alpha_j, f_\theta)|^2}{\sum_{j=1}^{M-3} |\delta(\alpha_j, f_\theta)|^2}.$$

25. A system for absolute surface testing of planar or spherical surfaces including in combination:

a phase shifting interferometer having a reference surface position and a test surface position for holding, respectively, a reference element and a test element in alignment with one another, with the reference surface position being fixed with respect to the remainder of elements of the interferometer and the test surface position mounted on a test piece mount including mechanisms for:

(A) effecting tilt of the test element in the y axis,
(B) effecting tipping of the test element in the x axis,
(C) angularly rotating the test element relative to the reference surface, and
(D) effecting orthogonal translation of the test element in both the x and y directions;

means for producing measured difference maps of first (A), second (B), and third (C) test elements in the following combinations at the reference surface positions and the test surface positions:

Measurement $m_1$:reference surface=A, test surface=C
Measurement $m_2$:reference surface=B, test surface=C
Measurement $m_3$:reference surface=B, test surface=A and at least two more rotational positions of flat A at the test surface position:
Measurement $m_4$:reference surface=B, test surface=A rotated by $\alpha_1$,
Measurement $m_5$:reference surface=B, test surface=A rotated by means for calculating rotationally sheared surface maps of the first test element A: and means for utilizing the measured difference maps and the rotationally sheared surface maps to produce absolute surface maps of the first (A), second (B), and third (C) test pieces.

26. The system according to claim 25 wherein the phase shifting interferometer is Fizeau interferometer.

27. The interferometer according to claim 25 wherein the test piece mount mechanism further includes a mechanism for effecting axial translation of the test piece toward and away from the reference surface.

* * * * *